Patented Mar. 8, 1932

1,848,504

UNITED STATES PATENT OFFICE

DAVID STRAUSS AND RUDOLF UHSEMANN, OF BITTERFELD, GERMANY, ASSIGNORS TO I. G. FARBENINDUSTRIE AKTIENGESELLSCHAFT, OF FRANKFORT-ON-THE-MAIN, GERMANY

PROCESS OF PRODUCING FORMIC ACID

No Drawing.    Application filed January 3, 1931. Serial No. 506,489.

Our invention relates to an improvement in the process for producing formic acid by decomposing formate of calcium with an about equimolecular quantity of concentrated sulfuric acid.

As is well known to persons skilled in the art considerable difficulties arise in the process owing to the physical behaviour of the sulfate of calcium produced during the reaction.

Formic acid cannot be produced in a practical manner from dry calcium formate and concentrated sulfuric acid, because, immediately after the addition of the sulfuric acid to the calcium formate, the reaction mass becomes solid owing to the formation of calcium sulfate (gypsum). As a result it is impossible to further mix the reaction mass and in those places where there is an excess of sulfuric acid, a decomposition of the formic acid produced takes place with the formation of carbon dioxide and water. By admixing a small amount of formic acid with the calcium formate and thus forming a paste, it is possible to inhibit to a certain extent the solidification of the reaction mass, but the result remains just as unsatisfactory as when using dry calcium formate.

In order to insure that the reaction mass remains sufficiently fluid after the sulfuric acid has been added to make possible the recovery of the formic acid without a great loss thereof, it is necessary to add to the calcium formate quite large amounts of formic acid, in fact an amount equal to more than three times the weight of the calcium formate which is to be decomposed is necessary. This amount corresponds to more than five times the amount of formic acid which is to be produced in the reaction. Obviously, one cannot prepare formic acid from calcium formate on a technical scale according to such a process.

We have found that the addition of certain sodium salts to the reaction mixtures yields a considerable improvement in performing the process, as it allows one to reduce the additional quantity of formic acid to a quantity of 0.6 parts to 1 part for each part of the formate of calcium, and as it brings about the advantage of preventing the sulfate of calcium from assuming a sticky consistency. According to our invention the presence of sodium-sulfate in the reaction mixture, in a moderate quantity up to 10% of the formate of calcium, has a most favorable influence on the physical behaviour of the gypsum formed during the reaction, even if the sodium sulfate is present in the small proportion of about two to three per cent only. Said sodium-sulfate may be added to the reaction mixture or to one of the starting materials; however we may also produce it by the interaction of an equivalent excess of sulfuric acid on formate of sodium added to the reaction mixture, by which procedure a corresponding quantity of formic acid is simultaneously produced. Obviously the effect aimed at is also obtained if in lieu of the formate of sodium a corresponding quantity of sodium carbonate, bicarbonate or hydroxide is employed.

For example, our process may be carried out as follows: In a closed mixing pan provided with a heating device and an agitator, and having an outlet for the vapors of formic acid leading to a condenser plant we mix while cooling (to maintain nearly the ordinary temperature) 1200 kgs. of formate of calcium with 800 to 1000 kgs. of formic acid of about 80 to 90 percent containing dissolved about 20 kgs. of sodium-sulfate, and thereafter with the equivalent quantity of sulfuric acid of 1,84 specific gravity. As the formate of calcium contains a certain percentage of impurities, the equivalent quantity of sulfuric acid required is previously determined by analysis. The reaction mixture is now heated in vacuo while stirring until the formic acid is distilled off. The gypsum is left behind in an essentially gritty form. The yield is approximately quantitative.

We claim:

1. In the process of producing formic acid by the interaction of sulfuric acid on a mixture of formate of calcium with formic acid, the improvement which comprises giving the reaction mixture of equivalent parts of sulfuric acid and formate of calcium a content of 0.6 to 1 part of formic acid per one part of formate of calcium and giving the reaction mixture an additional content of sulfate of sodium in the proportion of 1 to 10 percent of the formate of calcium, and heating the reaction mixture to distill off the formic acid.

2. In the process of producing formic acid by the interaction of sulfuric acid on a mixture of formate of calcium with formic acid, the improvement which comprises giving the reaction mixture of equivalent parts of sulfuric acid and formate of calcium a content of 0.6 to 1 part of formic acid per one part of formate of calcium, and giving the reaction mixture an additional content of a sodium compound and an equivalent excess in the quantity of sulfuric acid to form sulfate of sodium in the proportion of about 1 to 10 percent of the formate of calcium, and heating the reaction mixture to distill off the formic acid.

3. In the process of producing formic acid by the interaction of sulfuric acid on a mixture of formate of calcium with formic acid, the improvement which comprises giving the reaction mixture of equivalent parts of sulfuric acid and formate of calcium a content of 0.6 to 1 part of formic acid per one part of formate of calcium and giving the reaction mixture an additional content of a sodium salt of a volatile acid and an equivalent excess in the quantity of sulfuric acid to form sulfate of sodium in the proportion of 1 to 10 percent of the formate of calcium, and heating the reaction mixture to distill off the formic acid.

4. In the process of producing formic acid by the interaction of sulfuric acid on a mixture of formate of calcium with formic acid, the improvement which comprises giving the reaction mixture of equivalent parts of sulfuric acid formate of calcium a content of 0.6 to 1 part of formic acid per one part of formate of calcium and giving the reaction mixture an additional content of formate of sodium and an equivalent excess in the quantity of sulfuric acid to form sulfate of sodium in the proportion of 1 to 10 percent of the formate of calcium, and heating the reaction mixture to distill off the formic acid.

In testimony whereof, we affix our signatures.

DAVID STRAUSS.
RUDOLF UHSEMANN.